April 4, 1967 H. DECK ETAL 3,312,776

INSULATED CONDUCTOR AND METHOD OF FABRICATING THE SAME

Original Filed Dec. 3, 1962 2 Sheets-Sheet 1

INVENTORS
HAROLD DECK
BY LOWELL NOBLE
Paul B. Fihe
PATENT AGENT

INSULATED CONDUCTOR AND METHOD OF FABRICATING THE SAME

Original Filed Dec. 3, 1962

2 Sheets-Sheet 2

INVENTORS
HAROLD DECK
LOWELL NOBLE
BY Paul B. Fihe
PATENT AGENT 3,312,776

INSULATED CONDUCTOR AND METHOD OF FABRICATING THE SAME

Harold Deck, San Jose, and Lowell Noble, Hillsborough, Calif., assignors to Components for Research, Inc., Palo Alto, Calif., a corporation of California Continuation of application Ser. No. 241,866, Dec. 3, 1962. This application Apr. 4, 1966, Ser. No. 540,104
7 Claims. (Cl. 174—143)

Figures 1, 2:
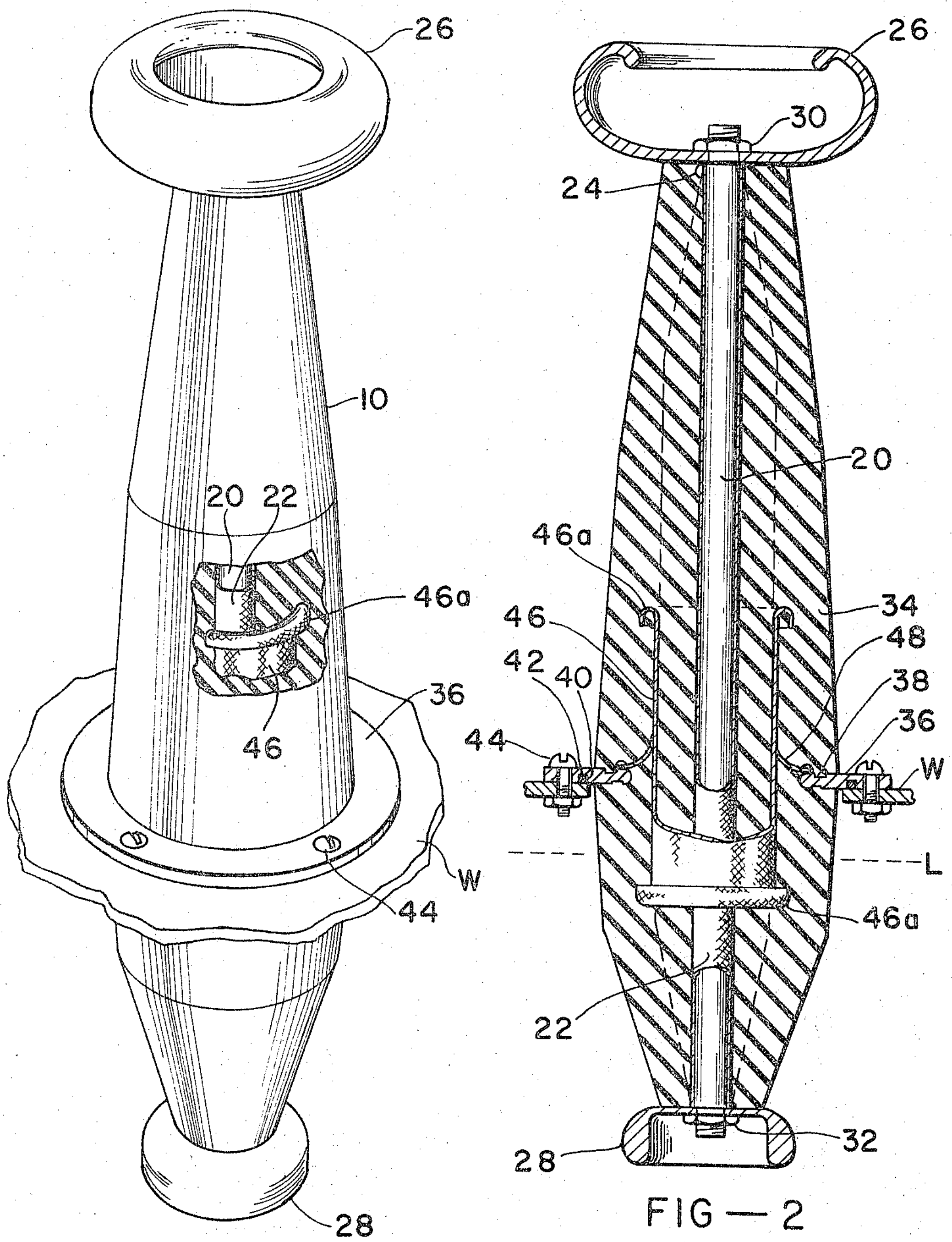

The present application is a continuation of applicants' prior application Ser. No. 241,866, filed Dec. 3, 1962.

The present invention relates generally to high voltage electrical conductors and more particularly to electrical conductors associated with insulators in a manner to withstand high voltage electrical stress. Furthermore, the invention concerns the method of fabricating such insulated conductors.

The extremely high voltages, 100 kilovolts and more, that have recently come into use in certain radar installations, have presented greatly increased insulating problems to avoid arcing, corona losses and other electrical breakdown or loss difficulties. At transition points such as exist where high voltage cables terminate or must pass through a metallic wall or partition, the problems are aggravated by a localized increase in the electrical stresses. As a consequence, continued experimentation has resulted in the development of extremely effective insulating materials, the epoxy resins being notable examples. The epoxy resins herein referred to are of the type comprising the resinous product of reaction between an epihalohydrin and a polyhydroxyphenol such as described in U.S. Patent No. 2,324,483. These epoxy resins are commonly mixed with filler materials such as pure silica and a curing agent and are cast in association with the conductor that is to be insulated. The resulting cast insulator has excellent characteristics; great mechanical strength, good adherence to the metallic conductor, and most important, a high degree of homogeneity and freedom from internal voids, particularly when cast under vacuum conditions, so that great dielectric strength and absence of corona losses is exhibited. However, one notable difficulty has been experienced with the use of such cast epoxy resin material in the fabrication of cable terminations, feed-through bushings, and other high voltage insulated conductor structures as a result of the different temperature coefficients of expansion of the cast material and the metallic conductor. The different expansion coefficients have produced, when temperature differentials in the range of 100 to 200° F. are experienced during the casting process, significant physical stresses and resultant fractures in the insulator material or even slight physical separation between the insulating material and the metallic conductor so that subsequent corona losses occur during operation.

Accordingly, it is the general object of the present invention to provide an insulated conductor arranged so that the cast insulating material and the associated metallic conductor accommodate the variances in expansion and contraction experienced, for example, during the actual casting process. Intimately related to this general object of the invention is the provision of a method for fabricating such an insulated conductor.

Yet more particularly, it is a feature of the invention to provide an insulated conductor which may take the specific form of an electrical feed-through bushing, a cable termination, or many other conformations of utility in the transmission of extremely high voltages.

In accordance with one specific aspect of the invention, a generally cylindrical flexible metallic conductor can be fully embedded within a cast insulator to serve as an electrical stress shield that provides equalized electrical stress distribution.

In accordance with yet another aspect of the invention, the flexible conductor can be electrically joined in a physically adjacent position to a relatively rigid conductor in a manner to eliminate physical stress in an encompassing cast insulator.

An additional feature of the invention is the provision of an insulated conductor wherein the conductor element is in the form of metallic braid which is not only somewhat flexible but contains apertures through which the casting material can freely pass during the casting process.

Yet a further feature of the invention is the provision not only of a general method for fabrication of an insulated conductor having the aforementioned features, but a method including steps specifically applicable, for example, to the fabrication of particular structures such as feed-through bushings.

These, as well as additional objects and features of the invention will become more apparent from a perusal of the following description of the exemplary structure and method for fabricating the same illustrated in the accompanying drawings wherein:

FIG. 1 is a side elevational view of an electrical feed-through bushing embodying the present invention, FIG. 2 is a central longitudinal sectional view through the bushing structure, and FIGS. 3 through 7, inclusive, constitute a series of views illustrating the successive steps of fabricating the feed-through bushing in accordance with the invention.

As shown in FIG. 1, the feed-through bushing 10 is a generally cylindrical structure mounted in an upright position in a circular aperture in the wall W of a tank that may house transformers or other electrical components to which connection must be made. The bushing 10 is secured in sealing relationship to the wall W at a position intermediate its length, and conventionally, the tank is filled with oil to a level indicated by dotted line L slightly below the upper tank wall so as to encompass a portion of the lower end of the bushing structure.

With additional references to FIG. 2, the generally cylindrical bushing structure 10 includes a central conductive rod 20 of cylindrical configuration that is externally threaded at each of its opposite ends. The rod can be composed of copper, aluminum or other metallic materials that are good conductors of electric current.

In accordance with one aspect of the present invention, the central metallic rod 20 is encompassed between its threaded ends with flexible metallic braid 22, preferably composed of a physically strong, electrically conductive material, such as bronze. To maintain the position of the braid 22 on the encompassed metallic rod 20 and insure electrical continuity therebetween, metal screws 24 are arranged to pass through small apertures in the braid and enter threaded holes in the metallic rod.

To opposite threaded ends of the rod 20, corona caps 26, 28 are secured, being held in position by suitable nuts 30 and 32, respectively. These corona caps 26, 28 are formed in a more or less conventional fashion to present a curved surface of predetermined configuration to equalize electrical stress distribution.

An insulator 34 preferably in the form of one of the mentioned epoxy resin castings, as hereinbefore mentioned, surrounds the central metallic rod 20 and the metallic braid 22 thereon. Longitudinally, the insulator 34 is disposed between the two corona caps 26, 28 and, as will be obvious, the length of the insulator and its diameter will be determined by the voltage applied to the described central rod 20.

An annular metallic flange 36 is secured in the insulator 34 adjacent its perimeter and intermediate its length and projects outwardly to enable mounting on the wall W.

To facilitate firm support within the cast insulator 34 small laterally-facing circumferential grooves 38 are formed in both faces of the flange and exteriorly of the insulator, another groove 40 is formed to support an O ring 42 arranged to effect sealing contact with the adjacent tank wall W upon which the entire bushing structure is mounted. To facilitate such mounting, suitable holes are drilled in the flange 36 to enable the passage therethrough of bolts 44 that in turn enter registering threaded holes in the adjacent tank wall W.

Since the wall W of the tank and the mounting flange 36 normally reside at ground potential and the central metallic rod 20 of the bushing is at a relatively high potential, an electric stress shield 46 is connected to the interior of the flange and is embedded within the cast insulator 34 to provide an equalization of the electrical stress and thus precludes electrical breakdown through the insulator. Preferably, in accordance with the present invention, this electrical stress shield 46 is in the form of a generally cylindrical section of flexible metallic braid having a diameter such that required spacing between the central rod 20 and the shield is sufficient to withstand the potential differences between these elements. Both ends of the shield braid are curved outwardly as indicated at **46*a* to provide a consequent equalization of the electrical stress distribution within the cast insulator 34. The stress shield 46 is electrically connected at its middle to the surrounding annular flange 36 by a curved braid section 48** so as to remain at ground potential at all times.

The cast insulator 34 of the described bushing structure 10 is free from mechanical stresses and is also free from any internal voids so that excellent electrical and mechanical characteristics result. The reason for these characteristics will become more apparent from the following detailed description of the method of fabrication of the described feed-through bushing.

Figure 3:
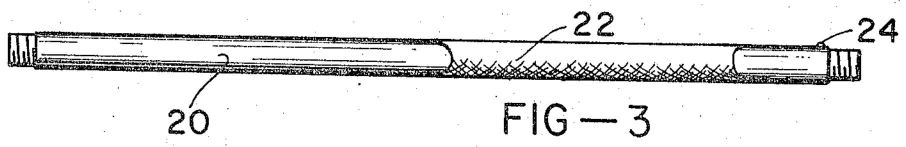

With initial reference to FIG. 3, the central metallic rod 20 is first machined to the desired dimensions, is appropriately threaded adjacent its opposite ends, and is drilled and tapped radially adjacent one end. The exterior surface of the metallic rod is then coated with a mold release material of a type specifically chosen to preclude tight adherence of the particular epoxy resin casting material to the rod 20 during the casting process. The metallic braid 22 is thereafter placed over the coated central metallic rod 20 and is firmly secured thereto by application of the described clamping screws 24. It is to be particularly observed that the mold release material is not applied to the flexible metallic braid 22. The central conductor including the metallic rod 20 with the mold release coating thereon and the encompassing metallic braid 22 is now ready for the initial casting process.

For such casting process, the assembly shown in FIG. 3 is placed in a suitable mold and the epoxy resin mixture is poured therein and subjected to a suitable heating and curing cycle. No details of the casting procedure need be given since they are well known in the art and vary to some extent depending upon the particular casting mixture. However, it is to be observed that an elevated temperature of perhaps 200° F. is experienced during the casting and curing process. Since the temperature does change considerably during the casting process and the epoxy resin mixture and the metallic rod 20 have different temperature coefficients of expansion, differences in expansion and contraction are experienced. However, since the central rod 20 is coated with mold release material, longitudinal differential movement is permitted so that the differences in expansion and contraction are accommodated without producing physical stresses in either the cast insulator 34 or in the encompassed central rod 20. On the other hand, no mold release has been applied to the flexible metallic braid 22 so that the epoxy resin mixture, in accordance with its known characteristics can establish tight adherent relationship therewith in the casting process. Differences of temperature coefficients of expansion do exist between these two materials, but in view of the flexibility of the braid 22, a slight movement thereof can occur to accommodate these differences. Thus, all physical stresses are actively eliminated.

Additionally, the presence of the mold release on the central metallic rod 20 does permit the formation of small voids or occlusions immediately adjacent such rod. However, these voids are all located interiorly of the flexible braid 22 and since this braid is at the same electrical potential as the encompassed rod 20, no electrical stress exists between the rod and the surrounding braid, and corona loss in such small voids is therefore nonexistent.

Figure 4:
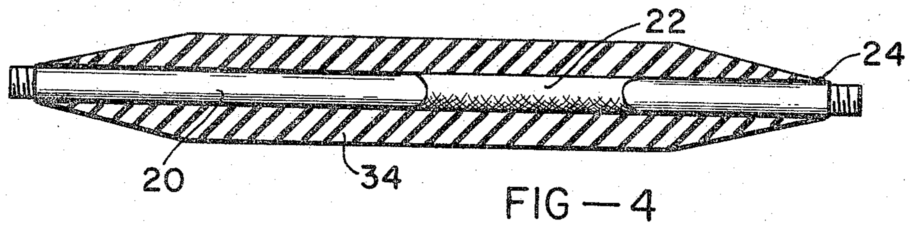
Figure 5:
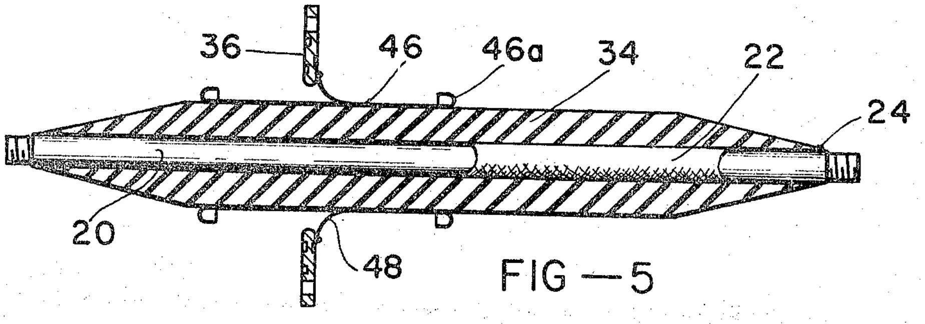

After the initial casting procedure is completed, the exterior of the initial casting is machined to an exterior configuration as illustrated in FIG. 4 which is that requisite for appropriate support of the described stress shield 46. The next step in the method entails the formation of the stress shield 46 from metallic braid into the described configuration and placement of such stress shield on the exterior of the completed casting as shown in FIG. 5. The annular flange 36 is, in turn, supported in its appropriate disposition by a suitable jig (not shown) and connection between the stress shield 46, and the flange 36 by the braid section 48 is made preparatory to the second and final operation.

Figures 6, 7:
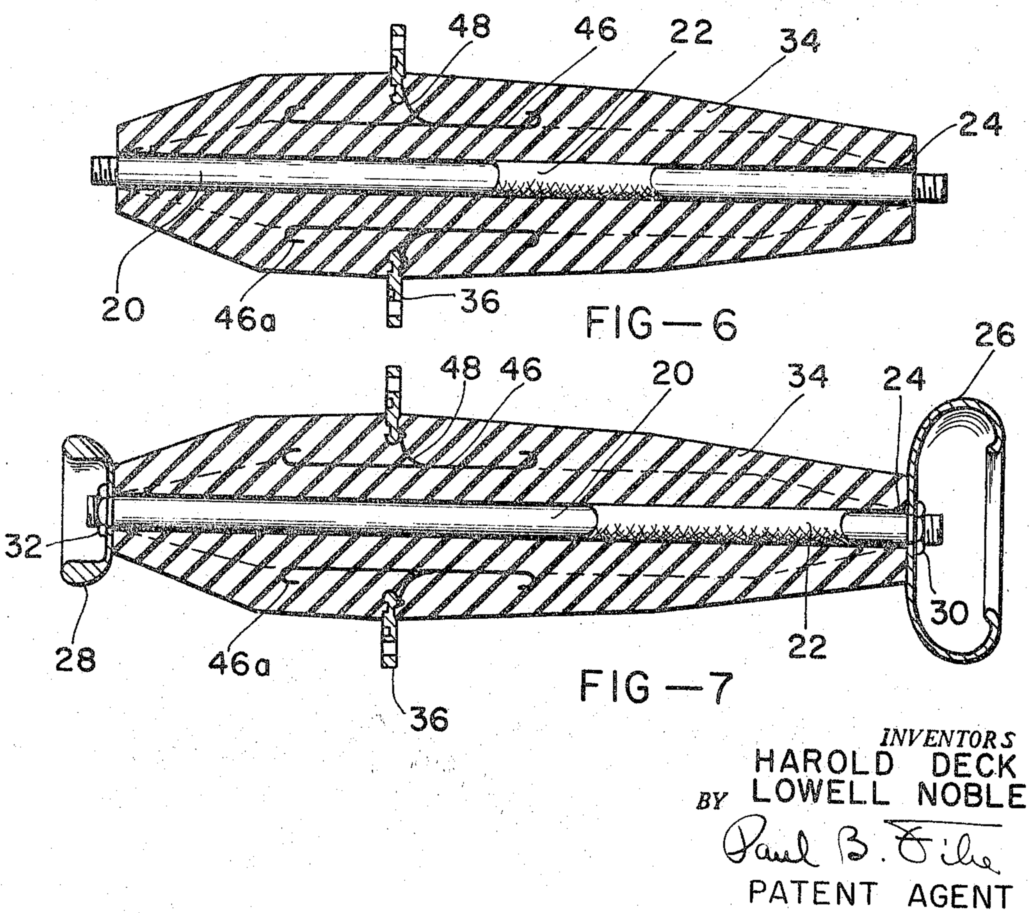

The assembly, as shown in FIG. 5, is placed in another mold cavity of appropriate dimensions and the castings procedure is repeated to provide a second casting that provides the conformation illustrated in FIG. 6, and generally encompasses the first casting, the stress shield 46, and a portion of the annular mounting flange 36. During the casting procedure, elevated temperatures are again experienced and differential expansion and contraction of the stress shield 46 and the epoxy resin material occur. More particularly, the differential expansion and contraction of the stress shield 46 relative to the casting material will occur both longitudinally and radially but because of the flexible nature of the metallic braid from which the stress shield 46 is formed, the differences in expansion and contraction are automatically accommodated so that no physical stresses are experienced in the casting material itself and no separation occurs between the metallic braid and the casting material so that the completed cast unit is free from physical stresses and internal voids.

Thereafter, the described corona caps 26, 28 are placed on both ends of the central metallic rod 20 and are secured in this position by application of the nuts 30, 32 to the threaded ends of the rod to thus complete the assembly, as illustrated in FIG. 7.

From the foregoing detailed description of the method of fabrication of a specific feed-through bushing 10, it will be understood that the method in its broader aspects constitutes the formation of an insulated conductor by the initial step of forming flexible metallic material in the desired conformation, and the subsequent step of casting the insulating material in contact with such flexible conductor. The general result is an insulated conductor that is free from electrically-deleterious voids and physically-deleterious stresses.

Dependent upon the particular structure being fabricated, additional specific steps may be included in the method, such as those specifically delineated relative to the fabrication of the described feed-through bushing or other equivalent steps requisite to meet another particular application of the general method. Accordingly, the foregoing description of one structure and the method of fabricating the same is to be considered as purely exemplary and not in a limiting sense, and the actual scope of the invention is to be indicated by reference to the appended claims.

What is claimed is:

1. An insulated conductor which comprises a metallic rod, a flexible, foraminous conductive sleeve contiguously encompassing said rod, and a void-free insulator encompassing said rod and said sleeve in adherent relation to said sleeve and non-adherent relation to said rod.

2. An insulated conductor according to claim 1 wherein said sleeve is composed of metallic braid.

3. An insulated conductor according to claim 1 which comprises means rigidly mechanically and electrically joining said sleeve to said rod at a single position.

4. An insulated conductor according to claim 1 which comprises a mold release agent between said rod and said sleeve.

5. A feed-through bushing which comprises
a metallic rod,
a flexible, foraminous conductive sleeve contiguously encompassing said rod,
a void-free insulator encompassing said rod and said sleeve in adherent relation to said sleeve and non-adherent relation to said rod, and
an annular conductor surrounding said rod and sleeve and separated therefrom by said insulator.

6. The method of fabricating an insulated conductor which comprises the steps of
coating the conductor with mold release material,
placing flexible metallic braid over the coated conductor in electrical contact with the metal thereof, and
casting insulating material over the conductor and braid,
whereby adherent relation is established between said insulating material and said braid but non-adherent relation is established between said insulating material and said conductor.

7. The method of fabricating a feed-through bushing which comprises
coating the exterior of a metallic rod with mold release material,
placing flexible metallic braid over the coated rod to substantially encompass the same and make electrical contact therewith,
casting insulating material over the rod and braid to encompass the same and form a first cast insulator,
placing flexible metallic braid around a portion of the cast insulator, and finally,
casting additional insulating material over the first cast insulator and the metallic braid thereon to completely encompass the latter.

References Cited by the Examiner

UNITED STATES PATENTS

| | | | |
|---|---|---|---|
| 283,764 | 8/1883 | Delany | 174—119 |
| 1,917,047 | 7/1933 | McCullough. | |
| 2,439,859 | 4/1948 | Muller | 174—140 |
| 2,669,702 | 2/1954 | Klostermann. | |
| 3,001,005 | 9/1961 | Sonnenberg | 174—142 |
| 3,146,518 | 9/1964 | Kishida | 174—143 X |
| 3,265,799 | 8/1966 | McWhirter. | |

FOREIGN PATENTS

| | | |
|---|---|---|
| 1,500 | 2/1932 | Australia. |
| 793,974 | 4/1958 | Great Britain. |
| 320,903 | 5/1957 | Switzerland. |

LARAMIE E. ASKIN, *Primary Examiner.*